United States Patent [19]

Puri

[11] Patent Number: 5,133,406
[45] Date of Patent: Jul. 28, 1992

[54] GENERATING OXYGEN-DEPLETED AIR USEFUL FOR INCREASING METHANE PRODUCTION

[75] Inventor: Rajen Puri, Tulsa, Okla.

[73] Assignee: Amoco Corporation, Chicago, Ill.

[21] Appl. No.: 726,053

[22] Filed: Jul. 5, 1991

[51] Int. Cl.⁵ .............................................. E21B 43/40
[52] U.S. Cl. ...................... 166/266; 166/52; 166/57; 166/65.1; 166/267; 166/268
[58] Field of Search ............... 166/266, 267, 268, 272, 166/302, 52, 65.1, 75.1, 57

[56] References Cited

U.S. PATENT DOCUMENTS

| | | | |
|---|---|---|---|
| 3,150,716 | 9/1964 | Strelzoff et al. | 166/266 X |
| 3,232,885 | 2/1966 | Henke | 166/268 |
| 3,653,438 | 4/1972 | Wagner | 166/266 |
| 4,114,688 | 9/1978 | Terry | 166/266 X |
| 4,250,230 | 2/1981 | Terry | 166/75.1 X |
| 4,305,464 | 12/1981 | Masszi | 166/370 |
| 4,353,418 | 10/1982 | Hoekstra et al. | 166/267 X |
| 4,767,606 | 8/1987 | Trocciola et al. | 423/351 |
| 4,792,502 | 9/1987 | Trocciola et al. | 429/19 |
| 4,883,122 | 11/1989 | Puri et al. | 166/263 |
| 4,895,710 | 1/1990 | Hartmann et al. | 166/268 X |
| 5,014,785 | 5/1991 | Puri et al. | 166/266 X |

OTHER PUBLICATIONS

"Coalbed Methane as a Fuel for Fuel Cell Power Plants," A. F. Ellis et al., 1986 Fuel Cell Seminar, pp. 333-336.

*Primary Examiner*—George A. Suchfield
*Attorney, Agent, or Firm*—Marcy M. Lyles

[57] ABSTRACT

A method for generating oxygen-depleted air for injection into a subterranean coal seam for increasing production of methane. Air and produced fluids comprising methane are input into a fuel cell power system; and fuel cell power system exhaust comprising oxygen-depleted air is injected into the coal seam.

12 Claims, 1 Drawing Sheet

GENERATING OXYGEN-DEPLETED AIR USEFUL FOR INCREASING METHANE PRODUCTION

BACKGROUND AND SUMMARY

The present invention is directed to a method for increasing production of methane from a coal seam and, more particularly, to inputting air and produced methane into a fuel cell power system and injecting the fuel cell power system exhaust comprising oxygen-depleted air into the coal seam.

Methane is the primary component of natural gas, a widely used fuel source. Subterranean coal seams contain substantial quantities of methane adsorbed onto the coal surface. Methane is produced from the coal seams for use as a fuel.

A wellbore is drilled into a subterranean coal seam for producing methane. The pressure difference between the coal seam and the wellbore provides the driving force for flowing methane to the wellbore. Reduction of pressure in the coal seam as methane is produced increases desorption of methane from the coal surface, but, at the same time, deprives the system of the driving force necessary to flow methane to the wellbore. Consequently, this method looses its effectiveness over time for producing recoverable methane reserves.

A method for producing coal seam methane by injecting an inert gas into the coal seam is disclosed in U.S. Pat. No. 4,883,122 (Puri et al.). The inert gas injection reduces methane partial pressure for desorbing methane from the coal surface. The inert gas can maintain or increase total pressure in the coal seam. This method is effective for increasing the total amount and rate of methane production from the coal seam.

The Puri et al. patent discloses that nitrogen is the preferred inert gas for the method for increasing methane production. Nitrogen must be transported to the methane production site or an air separation plant must be provided on-site to separate nitrogen from air.

The Puri et al. patent further discloses that air is a suitable source of nitrogen for the method for increasing methane production. However, injection of oxygen, which is a component of air, into a coal seam for increasing production of methane can present problems. Oxygen can cause corrosion and rust formation in well casings and other fluid conduits. Also, produced fluids comprising oxygen and methane are potentially flammable and/or explosive. It is desirable to provide an economically attractive method to minimize these potential problems by depleting the oxygen content of air before injecting air into a coal seam for increasing methane production.

An object of the present invention is to provide an economical method for increasing production of methane from a coal seam using oxygen-depleted air. Another object of the present invention is to provide a method for generating oxygen-depleted air for use in increasing production of methane from a subterranean coal seam. Other objects of the present invention will appear hereinafter.

The objects of the present invention can be attained by a method for increasing production of methane from a subterranean coal seam comprising the steps: producing fluids comprising methane from the subterranean coal seam through at least one production well; inputting air, as a source of oxygen, and a portion of the produced fluids comprising methane, as a source of hydrogen, into at least one fuel cell power system for generating fuel cell power system exhaust comprising oxygen-depleted air; and injecting fuel cell power system exhaust comprising oxygen-depleted air into the subterranean coal seam through at least one injection well.

The present invention has the advantages that nitrogen does not have to be transported to the methane production site nor does an air separation plant have to be provided on-site for separating nitrogen from air; part of the methane produced and oxygen from air are used in the fuel cell power system for generating oxygen-depleted air and electricity for on-site needs; a fuel cell power system operates efficiently with essentially no environmentally harmful emissions (no combustion is required); injecting oxygen-depleted air into the subterranean coal seam reduces potential for rust formation and corrosion in piping and wellbore casing; and injecting oxygen-depleted air into the subterranean coal seam reduces potential for flammable or explosive produced fluids.

For purposes of illustration, the method of this invention is described in relation to a fuel cell power system including a fuel processor, a power section, and a power conditioner. The method of the present invention contemplates the use of any fuel processor that can utilize coal seam methane as a fuel. Internal operation of the fuel cell power system components can differ from what is described below.

A test project utilizing coalbed methane as fuel for a fuel cell power system is disclosed in "Coalbed Methane as a Fuel for Fuel Cell Power Plants," A. F. Ellis, et al., *1986 Fuel Cell Seminar*. Tests verify that coalbed methane is a suitable alternative fuel for fuel cell power systems designed for natural gas operation.

Methane is often produced from at least two production wells in a subterranean coal seam. In the method of this invention, at least one of the production wells is converted to an injection well or at least one new injection well is drilled for injecting oxygen-depleted air into the coal seam. A fluid comprising oxygen-depleted air is injected through one or more injection wells into the subterranean coal seam. In one embodiment, production of methane from the coal seam is increased because the injected fluid maintains or increases the total reservoir pressure while the partial pressure of methane is reduced. Reduction of methane partial pressure increases desorption of methane from coal. In a preferred embodiment, the injection pressure is maintained substantially constant and the fluids comprising oxygen-depleted air are injected into the coal seam by continuous injection.

DETAILED DESCRIPTION OF THE INVENTION

Figure 1:
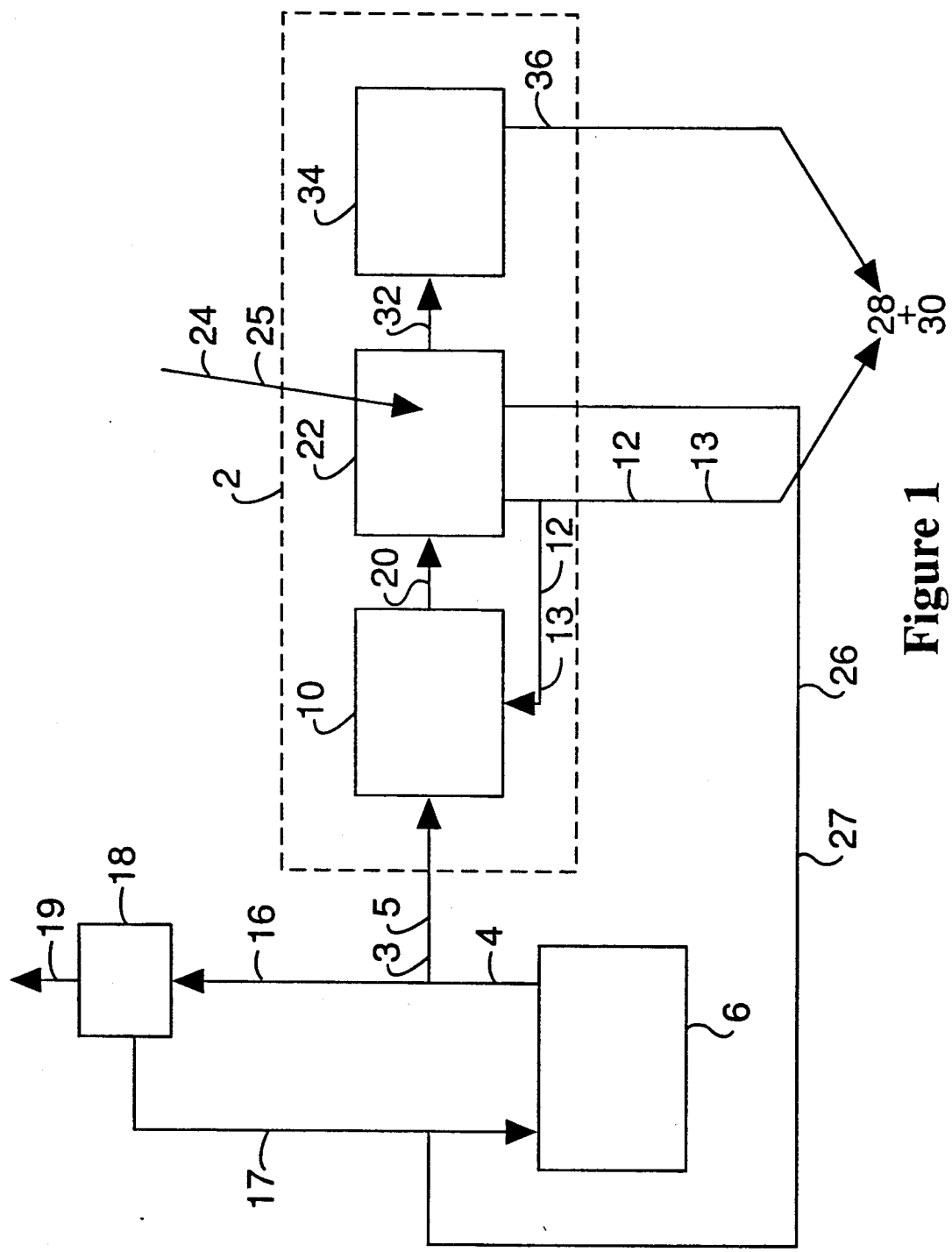
FIG. 1 illustrates flow paths for fluids out of a subterranean coal seam, through a fuel cell power system, and into a subterranean coal seam in the method of the present invention.

Coal seam fluids 4 are produced from a subterranean coal seam 6 through at least one production well by available methods such as by natural flow or pumping. Coal seam fluids 4 comprise methane and water; lesser amounts of nitrogen and carbon dioxide; and sometimes small amounts of other fluids such as argon and oxygen.

A portion of the coal seam fluids comprising methane 3 flows through input conduit 5 and is input to a fuel processor 10 of fuel cell power system 2. The balance of coal seam fluids comprising methane 16 is processed using separation means such as a nitrogen rejection unit 18, so that fluids comprising methane 19 can be sold and fluids comprising nitrogen 17 can be injected into the coal seam 6 for increasing methane production.

The portion of the coal seam fluids comprising methane 3 input to fuel processor 10 can be a portion of total produced fluids at a site or can be the output from at least one production well dedicated to supplying the input to fuel processor 10. Water 12 and heat 13 are also input to fuel processor 10. Within the fuel processor 10, methane is reformed with water 12 and heat 13 in the form of steam to produce carbon monoxide and hydrogen; and then the carbon monoxide is reacted with water to generate carbon dioxide and hydrogen. The volume of the portion of the coal seam fluids comprising methane 3 input to the fuel processor 10 depends upon the sizing of the fuel cell power system 2 and is easily calculated by those skilled in the art depending upon the desired outputs. For example, a commercially available 200 KW (kilowatt) fuel cell power system consumes about 46 MSCFD (thousand standard cubic feet per day) (1.3 MSCMD (thousand standard cubic meters per day)) of natural gas and generates about 500 MSCFD (14.2 MSCMD) of oxygen-depleted air.

Fluids exiting the fuel processor 10, hydrogen-rich fluids 20, are input to the anode of the power section 22 of the fuel cell power system 2. Air 24 is input to the cathode of the power section 22 through air conduit 25. Within the power section 22, hydrogen reacts with oxygen to generate water, heat, and electricity.

In somewhat greater detail, hydrogen is oxidized at the anode of the power section to hydrogen cations and electrons. As hydrogen cations migrate through an electrolyte from the anode to the cathode, electrons move through an external circuit creating direct current (DC) electricity 32. Oxygen from air reacts with the hydrogen cations and electrons at the cathode of the power section 22 to form water. A byproduct of this reaction is oxygen-depleted air 26. Fuel cell power system exhaust comprising oxygen-depleted air 26 flows through outlet conduit 27 and is injected into coal seam 6 through at least one injection well for increasing production of methane from coal seam 6.

The fuel cell power system exhaust comprising oxygen-depleted air 26 comprises primarily nitrogen and lesser amounts of other fluids in the system such as carbon dioxide and oxygen. For example, a commercially available 200 KW fuel cell power system generates oxygen-depleted air comprising about 84.5 vol% nitrogen, about 7.2 vol% carbon dioxide, and about 8.3 vol% oxygen. The upper limit of oxygen in the fuel cell power system exhaust is about 8–9 vol%.

The amount of oxygen in the oxygen-depleted air 26 for injection can be reduced by conventional techniques. For example, oxygen content in the oxygen-depleted air 26 can be reduced to below about 5 vol% by utilizing a commercial oxygen separator such as a catalytic combustion unit or a membrane separator. Produced fluids containing methane and more than about 10 vol% oxygen are potentially flammable and/or explosive. It is expected that even with the upper limit of 8 to 9 vol% oxygen in injection fluid comprising oxygen-depleted air 26, the vol% oxygen in produced fluids would be significantly lower because some oxygen will be absorbed by the coal seam. Relatively small amounts of oxygen in the injection fluid comprising oxygen-depleted air 26 are acceptable because damage to well casings and fluid conduits is minimized. Any fuel cell power system exhaust comprising oxygen-depleted air 26 which is not injected into the coal seam 6 is safely released to the atmosphere.

The amount of carbon dioxide in the injection fluid comprising oxygen-depleted air 26 can be reduced by conventional techniques such as amine separation. Some carbon dioxide is also absorbed by coal. It is contemplated that small amounts of carbon dioxide can be injected into coal seam 6 with no detrimental effects.

It is contemplated that engineering skills will be utilized in implementing the method of the present invention at a particular site, especially regarding fluid separations. For example, if the coal seam fluids 4 for input into the fuel processor 10 comprise too much nitrogen for the fuel processor to operate efficiently, then a nitrogen rejection unit can be placed online prior to the fuel processor 10.

A power conditioner 34 is used to convert the DC electricity 32 produced in the fuel cell power section to alternating current (AC) electricity 36. The AC electricity 36 is an important power resource. Onsite generation of electricity eliminates the need to provide on-site power generators or to bring in electricity from an outside source. The electricity can be used to power on-site needs 30 such as pumps, compressors, well cathodic protection, etc. Excess electricity can be sold in a commercial market 28, especially in remote or foreign locations where there is a market for electricity.

Other byproducts of the reactions in the power section 22 are water 12 and heat 13, which are used in the fuel processor 10 of the fuel cell power system 2. The water 12 produced in this reaction is pure water. Any excess water 12 not required for use in the fuel processor 10 can be sold in a commercial market 28. Many subterranean coal seam methane production-sites are in remote locations where pure water is scarce and this pure water 12 fulfills an important need. Further, any excess water 12 can be utilized for other on-site needs 30 such as for kitchen facilities or cleaning needs.

In designing this process, basic considerations are amount of oxygen-depleted air needed for injection and electrical power needs. For example, a model study for a projected 54-year enhanced coal seam methane recovery project predicts volumes of nitrogen injected and volumes of fluids produced on a yearly basis. Nitrogen injection is started in year number three. Nitrogen begins to be produced in year number eight. Produced nitrogen is injected into the subterranean coal seam, supplementing the volume of nitrogen which must be provided to inject the total volume for the year. Electrical power needs at the site vary with coal seam fluid production rate, but remain stable relative to the steadily increasing nitrogen requirement.

During projected year 10 of the project, 3,822 MSCFD (108.2 MSCMD) of nitrogen is injected into the coal seam. During that year, 4,334 MSCFD (122.7 MSCMD) of methane and 44 MSCFD (1.2 MSCMD) of nitrogen are produced. Thus, 3,778 MSCFD (107.0 MSCMD) of nitrogen must be provided for injection. The operation requires about 1 MWD (megawatt per day) of electricity. Five 200 KW fuel cell power systems provide about 5,000 MSCFD (141.6 MSCMD) of oxygen-depleted air, comprising about 4,225 MSCFD (119.6 MSCMD) of nitrogen, and about 1 MWD of electricity. Excess oxygen-depleted air that is not needed for injection is safely vented to the atmosphere. Use of the fuel cell technology at this point provides both the nitrogen and electricity needs of the project.

Although the present invention is described in relation to utilizing fuel cell generated oxygen-depleted air in a coal seam methane enhanced production project, the invention is not limited to this application. Excess fuel cell generated oxygen-depleted air can be injected into a wellbore in any process requiring subterranean injection of nitrogen, e.g., a pressure maintenance project where injection of nitrogen is used to prevent gas and oil from separating. Further modifications, apart from those shown or suggested herein, can be made within the scope and spirit of the present invention.

What is claimed is:

1. A method for increasing production of methane from a subterranean coal seam comprising the steps:
   (a) producing fluids comprising methane from the subterranean coal seam through at least one production well;
   (b) inputting air, as a source of oxygen, and a portion of the produced fluids comprising methane, as a source of hydrogen, into at least one fuel cell power system for generating fuel cell power system exhaust comprising oxygen-depleted air; and
   (c) injecting fuel cell power system exhaust comprising oxygen-depleted air into the subterranean coal seam through a least one injection well.

2. A method as described in claim 1, wherein in step (b) all of the produced fluid input into the at least one fuel cell power system comes from one production well.

3. A method as described in claim 1, further comprising:
   separating fluids comprising oxygen from the fuel cell power system exhaust comprising oxygen-depleted air prior to injecting the fuel cell power system exhaust comprising oxygen-depleted air into the subterranean coal seam.

4. A method as described in claim 1, further comprising:
   separating fluids comprising carbon dioxide from the fuel cell power system exhaust comprising oxygen-depleted air prior to injecting the fuel cell power system exhaust comprising oxygen-depleted air into the subterranean coal seam.

5. A method as described in claim 1, further comprising:
   separating fluids comprising nitrogen from the produced fluids comprising methane before inputting the produced fluids comprising methane into the at least one fuel cell power system.

6. A method as described in claim 1, further comprising:
   reforming methane from the produced fluids comprising methane with steam to produce hydrogen cations within the at least one fuel cell power system.

7. A method for generating oxygen-depleted air for use in increasing production of methane from a subterranean coal seam, comprising the steps:
   (a) producing fluids comprising methane from the subterranean coal seam through at least one production well;
   (b) inputting air, as a source of oxygen, and a portion of the produced fluids comprising methane, as a source of hydrogen, into at least one fuel cell power system for generating fuel cell power system exhaust comprising oxygen-depleted air; and
   (c) injecting fuel cell power system exhaust comprising oxygen-depleted air into the subterranean coal seam through a least one injection well.

8. A method for increasing production of methane from a subterranean coal seam comprising the steps:
   (a) producing fluids comprising methane from the subterranean coal seam through at least one production well;
   (b) separating nitrogen from the produced fluids comprising methane;
   (c) inputting air and a portion of the produced fluids comprising methane into at least one fuel cell power system;
   (d) reacting oxygen from the air with hydrogen from the produced fluids comprising methane within the at least one fuel cell power system to produce electricity and fuel cell power system exhaust comprising oxygen-depleted air;
   (e) separating oxygen from fuel cell power system exhaust comprising oxygen-depleted air; and
   (f) injecting fuel cell power system exhaust comprising oxygen-depleted air into the subterranean coal seam through at least one injection well.

9. A system for increasing production of methane from a subterranean coal seam comprising:
   (a) at least one injection well in the subterranean coal seam for injecting oxygen-depleted air into the subterranean coal seam;
   (b) at least one production well in the subterranean coal seam for producing coal seam fluids comprising methane from the subterranean coal seam; and
   (c) at least one fuel cell power system fueled by air and produced coal seam fluids comprising methane for generating oxygen-depleted air for injection into the subterranean coal seam.

10. A system as described in claim 9 further comprising:
    (a) at least one input conduit for flowing coal seam fluids comprising methane from the at least one production well to the at least one fuel cell power system;
    (b) at least one air conduit for flowing air into the at least one fuel cell power system; and
    (c) at least one outlet conduit for flowing oxygen-depleted air from the at least one fuel cell power system to the at least one injection well.

11. A system as described in claim 9 further comprising:
    (a) means for separating oxygen from oxygen-depleted air; and
    (b) means for separating carbon dioxide from oxygen-depleted air.

12. A system as described in claim 9 further comprising means for separating nitrogen from coal seam fluids comprising methane.

* * * * *